(12) United States Patent
Yao (10) Patent No.: US 11,126,377 B2
(45) Date of Patent: Sep. 21, 2021

(54) ACCESSING SOLID STATE DISK

(71) Applicant: New H3C Information Technologies Co., Ltd., Hangzhou (CN)

(72) Inventor: Shaoqin Yao, Beijing (CN)

(73) Assignee: New H3C Information Technologies Co., Ltd., Zhejiang (CN)

(*) Notice: Subject to any disclaimer, the term of this patent is extended or adjusted under 35 U.S.C. 154(b) by 0 days.

(21) Appl. No.: 16/604,984

(22) PCT Filed: Apr. 12, 2018

(86) PCT No.: PCT/CN2018/082740
§ 371 (c)(1),
(2) Date: Oct. 11, 2019

(87) PCT Pub. No.: WO2018/188618
PCT Pub. Date: Oct. 18, 2018

(65) Prior Publication Data
US 2020/0159458 A1 May 21, 2020

(30) Foreign Application Priority Data
Apr. 14, 2017 (CN) .......................... 201710244793.5

(51) Int. Cl.
*G06F 3/06* (2006.01)
*G06F 12/0804* (2016.01)
*G06F 12/10* (2016.01)

(52) U.S. Cl.
CPC .......... *G06F 3/0659* (2013.01); *G06F 3/0604* (2013.01); *G06F 3/068* (2013.01);
(Continued)

(58) Field of Classification Search
CPC ...... G06F 3/0604; G06F 3/0659; G06F 3/068; G06F 12/0804; G06F 12/10; G06F 2212/1032
See application file for complete search history.

(56) References Cited

U.S. PATENT DOCUMENTS

2009/0204872 A1  8/2009  Yu et al.
2012/0284587 A1* 11/2012  Yu .......................... G06F 3/0631
                                                                714/773
(Continued)

FOREIGN PATENT DOCUMENTS

CN       101727295 A     6/2010
CN       101819509 A     9/2010
(Continued)

OTHER PUBLICATIONS

ISA State Intellectual Property Office of the People's Republic of China, Written Opinion of the International Searching Authority Issued in Application No. PCT/CN2018/082740, dated May 30, 2018, WIPO, 3 pages.
(Continued)

*Primary Examiner* — Eric T Oberly
(74) *Attorney, Agent, or Firm* — McCoy Russell LLP (57) ABSTRACT

A method of accessing a Solid State Disk (SSD) and an SSD are provided, where the SSD includes: a cache, N physical channels, and flashes mounted to the physical channels. The cache includes a plurality of strips. Each of the plurality of strips includes N sectors, N being an integer greater than or equal to 3. The method is applied to the SSD. According to the method, a data writing command for the SSD is received; a first strip and a first sector that correspond to an LBA of data to be written carried in the data writing command are determined; when the first strip is present in the cache, the data to be written is written into the cache as data of the first sector; and when the first strip is absent in the cache, the first strip is established and the data to be written is written into the cache as data of the first sector.

10 Claims, 5 Drawing Sheets

(52) U.S. Cl.
CPC .......... *G06F 12/0804* (2013.01); *G06F 12/10* (2013.01); *G06F 2212/1032* (2013.01)

(56) References Cited

U.S. PATENT DOCUMENTS

| | | | |
|---|---|---|---|
| 2014/0013025 A1* | 1/2014 | Jannyavula Venkata | G06F 3/061 711/103 |
| 2015/0058384 A1 | 2/2015 | Karamanolis et al. | |
| 2015/0160999 A1 | 6/2015 | Seo et al. | |
| 2016/0077962 A1 | 3/2016 | Ehrlich et al. | |
| 2016/0188410 A1 | 6/2016 | Lee | |
| 2016/0196216 A1* | 7/2016 | Lee | G06F 3/0689 711/170 |
| 2016/0259555 A1* | 9/2016 | Karamcheti | G06F 3/0679 |
| 2018/0232181 A1* | 8/2018 | Zhou | G06F 3/0688 |
| 2019/0172537 A1* | 6/2019 | Peddle | G11C 11/4063 |

FOREIGN PATENT DOCUMENTS

| | | |
|---|---|---|
| CN | 101840364 A | 9/2010 |
| CN | 102713828 A | 10/2012 |
| CN | 102779548 A | 11/2012 |
| CN | 104641419 A | 5/2015 |
| CN | 105739915 A | 7/2016 |
| JP | 2006244122 A | 9/2006 |
| JP | 2012064158 A | 3/2012 |

OTHER PUBLICATIONS

European Patent Office, Extended European Search Report Issued in Application No. 18785096.1, dated Mar. 6, 2020, Germany, 7 pages.

ISA State Intellectual Property Office of the People's Republic of China, International Search Report Issued in Application No. PCT/CN2018/082740, dated May 30, 2018, WIPO, 4 pages.

State Intellectual Property Office of the People's Republic of China, Office Action and Search Report Issued in Application No. 201710244793.5, dated Aug. 21, 2019, 10 pages. (Submitted with Partial Translation).

Japanese Patent Office, Office Action Issued in Application No. 2019-556277, dated Sep. 15, 2020, 6 pages. (Submitted with Machine Translation).

* cited by examiner

ACCESSING SOLID STATE DISK

CROSS REFERENCE TO RELATED APPLICATION

The present application is a U.S. National Phase of International Patent Application Serial No. PCT/CN2018/082740 entitled "SOLID-STATE DISK ACCESS," filed on Apr. 12, 2018. International Patent Application Serial No. PCT/CN2018/082740 claims priority to Chinese Patent Application No. 201710244793.5 filed on Apr. 14, 2017. The entire contents of each of the above-cited applications are hereby incorporated by reference in their entirety for all purposes.

BACKGROUND

A Solid State Disk (SSD) mainly includes a controller and a Flash. At present, an SSD generally employs a multi-channel parallel technique so as to provide higher data reading and writing speeds. Specifically, a controller may use a plurality of physical channels to operate a plurality of Flashes in parallel.

DETAILED DESCRIPTION OF THE EMBODIMENTS

Illustrative examples will be described in detail herein with the examples thereof expressed in the drawings. When the following descriptions involve the drawings, like numerals in different drawings represent like or similar elements unless stated otherwise. The implementations described in the following examples do not represent all implementations consistent with the present disclosure. On the contrary, they are examples of a device and a method consistent with some aspects of the present disclosure described in detail in the appended claims.

The terminology used in the present disclosure is for the purpose of describing a particular example only, and is not intended to limit the present disclosure. The singular forms such as "a", 'said", and "the" used in the present disclosure and the appended claims are also intended to include multiple, unless the context clearly indicates otherwise. It shall be also understood that the term "and/or" as used herein refers to any or all possible combinations that include one or more associated recited items.

It should be appreciated that although different information may be described using the terms such as first, second, third, etc. in the present disclosure, such information should not be limited to these terms. Such terms are used only to distinguish the same type of information from each other. For example, without departing from the scope of the present disclosure, the first information may also be referred to as the second information and similarly, the second information may also be referred to as the first information. Depending on the context, the word "if" as used herein may be interpreted as "when" or "as" or "determining in response to".

Data reading and writing can be performed in parallel by using a multi-channel parallel technique. However, data reading and writing may not be always continuous in practical application and may be random in most cases. Thus, accessing a flash mounted to a same physical channel simultaneously will result in an access conflict. A scheme for solving this access conflict problem is mainly to carry out data striping. The striping technique is a technique of automatically balancing a load of data reading and writing to flashes mounted to different physical channels.

Figure 1:
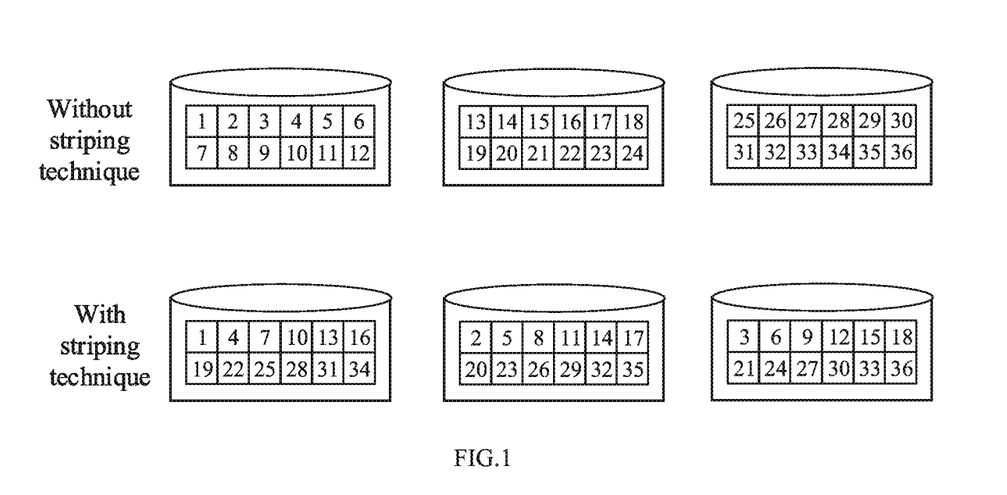
FIG. 1 is a schematic diagram illustrating comparison between data storage without a striping technique and data storage with the striping technique according to an example of the present disclosure.

As shown in FIG. 1, by using the striping technique, data can be divided into a plurality of pieces of sub-data of a predetermined size and the plurality of pieces of sub-data may be then stored in flashes mounted to different physical channels, respectively, thereby achieving parallel data reading and writing and effectively avoiding the access conflict.

Further, a flash has a characteristic that the flash can be programmed only after being erased. A minimum unit of erasing is a block and a minimum unit of reading and writing is a page. A block may contain a plurality of pages. When data in a flash is to be modified, it is not allowed to overwrite original data directly with new data but to read out data in a whole block and store it in a memory, and the data to be modified may be updated to new data in the memory; then, the data in the whole block may be erased and the modified data in the memory may be written into this block. In this way, a Write Application problem of an SSD may be caused. For example, it is assumed that 1024 pages in a block are all fully written. If it is desired to modify data in one page, all data in the block which the one page belongs to needs to be read into the memory to modify the data in the one page and then all the data of the block in a flash may be erased so that the modified data in the memory may be written into the block. In this case, a write application ratio is 1024.

An SSD has a problem of a huge write application ratio, thereby affecting the performance and the service life of the SSD.

Figure 2:
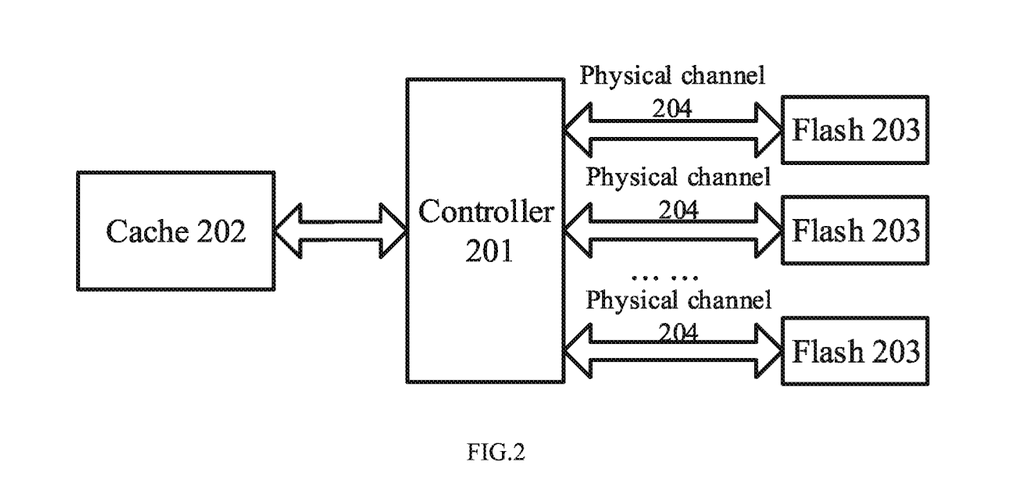
FIG. 2 is a schematic diagram illustrating a structure of a Solid State Disk (SSD) according to an example of the present disclosure.

To solve the above problem, a method of accessing an SSD and a device to which the method is applicable are provided in the following examples of the present disclosure. As shown in FIG. 2, an SSD provided in an example of the present disclosure may include: a controller 201, a cache 202, more than three physical channels 204, and flashes 203 respectively mounted to each of the physical channels 204, where the cache 202 may be a storage space partitioned from a memory. The SSD provided in an example of the present disclosure may perform data reading and writing by using a multi-channel parallel technique and a striping technique.

Figure 3:
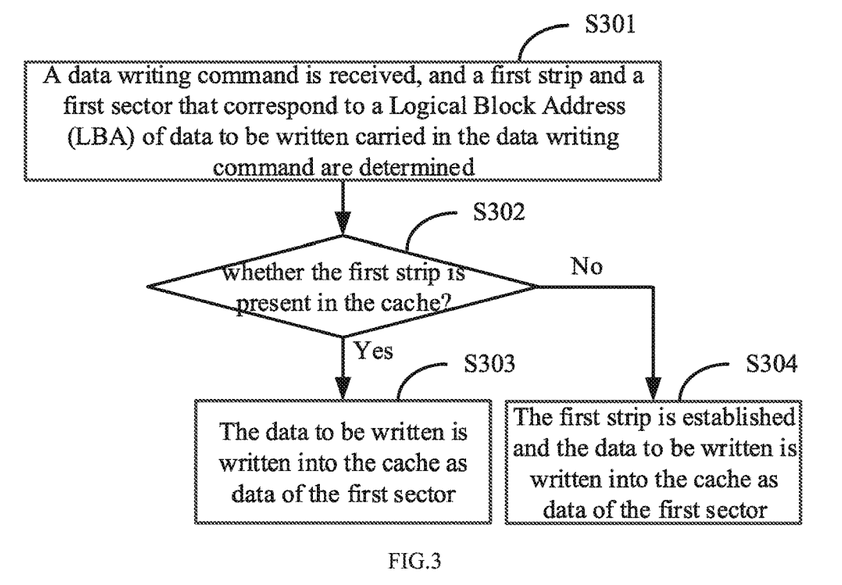
FIG. 3 is a flowchart illustrating a method of accessing an SSD according to an example of the present disclosure.

On this basis, as shown in FIG. 3, the method of accessing an SSD according to an example of the present disclosure may include the following blocks.

At Block S301, a data writing command may be received, and a first strip and a first sector that correspond to a Logical Block Address (LBA) of data to be written carried in the data writing command may be determined.

Each strip may include more than three sectors, and a number of sectors included in each strip is equal to a number of physical channels in the SSD and also equivalent to a number of flashes in the SSD. For example, when the number of physical channels in the SSD is 4, each strip includes 4 sectors.

At Block S302, whether the first strip is present in the cache may be determined; if yes, Block S303 is executed; otherwise, Block S304 is executed.

At Block S303, the data to be written may be written into the cache as data of the first sector.

At Block S304, the first strip may be established and the data to be written may be written into the cache as data of the first sector.

In the method provided in the above example of the present disclosure, a cache 202 may be provided in the SSD, and the SSD may store in the cache 202 the data to be written first after receiving a data writing command. Since some hotspot data to be modified frequently may be stored in the cache 202, it is only desired to modify the data in the cache 202 without repeatedly erasing and programming the flash 203, thereby reducing the write application ratio.

The method of accessing an SSD as described above will be described in more detail below. The SSD may provide a fault-tolerant mechanism by calculating redundant check data. The principle of the fault-tolerant mechanism is to perform check calculation on user data in each strip in a cache to obtain check data and distribute the check data to flashes mounted to different physical channels according to a particular law. Thus, when a physical channel is invalid, for example, the physical channel fails or a flash mounted to the physical channel fails, data recovery can be performed. In addition, when reading data of a sector in a strip fails, data recovery can also be performed.

A storage space may be partitioned from a memory as a cache for caching data of a sector in a strip and storing record information of the strip.

In an example of the present disclosure, a size of a sector may be taken as a strip depth and the number N of physical channels may be taken as a strip width. Thus, each strip may include N sectors. To provide the fault-tolerant mechanism, N sectors of each strip may include N1 user data sectors for storing user data, and N2 check data sectors for storing check data, where N1+N2=N and N1>N2. For example, the size of a sector may be 4K bits.

In an example, N sectors in each strip may be numbered from 0, i.e., sector 0, sector 1, sector 2, . . . , sector N−1, and the last N2 sectors may be fixed as check data sectors.

On this basis, the method of accessing an SSD according to an example of the present disclosure may include the following contents.

Data Writing

Figure 4:
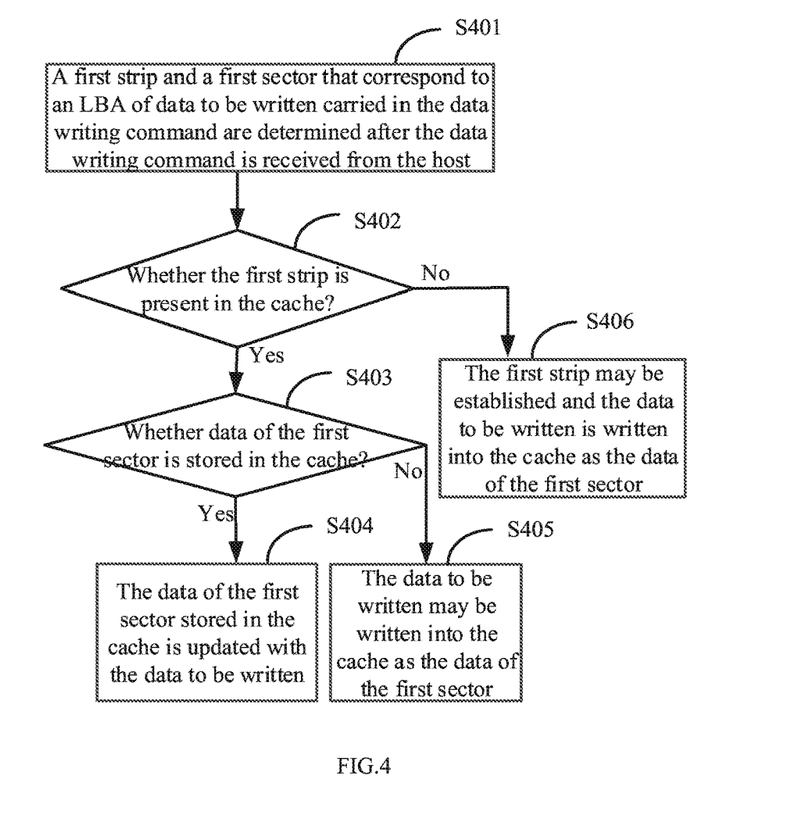
FIG. 4 is a flowchart illustrating a writing operation after a data writing command is received according to an example of the present disclosure.

As shown in FIG. 4, the SSD may perform a writing operation as follows after receiving a data writing command from a host.

At Block S401, a first strip and a first sector that correspond to an LBA of data to be written carried in the data writing command may be determined after the data writing command is received from the host.

A method of determining an index strip_index of the first strip and an identifier sector_id of the first sector corresponding to the LBA may be as shown in a formula (1) and a formula (2):

$$\text{strip\_index} = \lfloor LBA/N1 \rfloor \qquad \text{Formula (1)}$$

$$\text{sector\_id} = LBA \ \% \ N1 \qquad \text{Formula (2)}$$

Where $\lfloor \ \rfloor$ represents a rounding-down operator, and % represents a mod operator.

With the formula (1), different LBAs may be assigned to different strips. Also, every N1 continuous LBAs starting from an initial value of the LBA may be assigned to a same strip.

When N1=4, the index of the strip and the identifier of the sector corresponding to the LBA, which are calculated according to the formula (1) and the formula (2), respectively, may be as shown in Table 1.

TABLE 1

| strip_index | sector_id | | | |
|---|---|---|---|---|
| | 0 | 1 | 2 | 3 |
| 0 | LBA: 0 | LBA: 1 | LBA: 2 | LBA: 3 |
| 1 | LBA: 4 | LBA: 5 | LBA: 6 | LBA: 7 |
| 2 | LBA: 8 | LBA: 9 | LBA: 10 | LBA: 11 |
| 3 | LBA: 12 | LBA: 13 | LBA: 14 | LBA: 15 |
| . . . | . . . | . . . | . . . | . . . |

Assuming that the LBA of the data to be written at Block S401 is 14, the index of the first strip and the identifier of the first sector corresponding to the data to be written may be determined to be 3 and 2 according to the formula (1) and the formula (2) respectively.

At Block S402, whether the first strip is present in the cache may be determined; if yes, Block S403 is performed; otherwise, Block S406 is performed.

For example, a plurality of Hash buckets may be pre-established in a memory. Each Hash bucket is configured to store indexes and caching addresses of record information of a plurality of strips. Thus, a method of determining whether the first strip is present in the cache at Block S402 may be as follows.

Hash calculation may be performed for the index of the first strip and the number of physical channels, N, and the Hash calculation result may be taken as a bucket Identifier (ID). Then, a Hash bucket identified by the bucket ID may be searched for in the memory. For example, Cyclic Redundancy Check 32 (CRC32) calculation may be performed on a sum of the index of the first strip and N and then lower 18 bits of the calculation result may be taken as the bucket ID.

Whether the index of the first strip is present in the obtained Hash bucket may be determined. If yes, it is determined that the first strip is present in the cache and the caching address of the record information of the first strip may be obtained from the Hash bucket. Otherwise, it is determined that the first strip is absent in the cache.

At Block S403, whether data of the first sector is stored in the cache may be determined. If yes, Block S404 is performed; otherwise, Block S405 is performed.

After the caching address of the record information of the first strip is obtained, the record information of the first strip may be obtained from the cache and whether the data of the first sector is stored in the cache may be then determined according to the obtained record information. Data of the strip stored in the cache may be written into a flash upon aging of the strip, and when data of a sector in the strip is to be modified, modified new data of the sector may be written into the cache. Therefore, modified data (also referred to as latest data) of the sector may be stored in the cache, and the data of the sector before modification (also referred to old data) may also be stored in the flash. Thus, to facilitate determining whether the data of the sector is stored in a cache or in a flash, a corresponding first marker and a corresponding second marker may be set for each sector in the record information of the strip. The first marker and the second marker may together represent data storage conditions in the cache and the flash. For example, when the first marker and the second marker of the sector are both valid, it may represent the data of the sector is stored in both the cache and the flash, however, the data stored in the cache may be the latest data of the sector and the data stored in the flash may be old data of the sector. When the first marker of the sector is valid and the second marker thereof is invalid, it may represent that the data of the sector is stored in the cache and no data of the sector is stored in the flash. When the first marker of the sector is invalid and the second marker thereof is valid, it may present that the data of the sector is not stored in the cache but in the flash. When both the first marker and the second marker of the sector are invalid, it may represent that the data of the sector is not stored in both the cache and the flash.

When the data of a sector in a strip is stored in the cache, a caching address of the data of the sector in the cache may also be recorded in the record information of the strip.

In this way, whether the first marker of the first sector is valid may be determined at Block S403. If yes, it may be determined that the data of the first sector is stored in the cache.

At Block S404, the data of the first sector stored in the cache may be updated with the data to be written. Then, the data to be written is the latest data of the first sector.

For example, at Block S404, the data of the first sector stored in the cache may be updated with the data to be written in a manner as follows: writing the data to be written into the cache; and updating the caching address of the data of the first sector recorded in the record information of the first strip with the caching address that the data to be written is written into the cache; and maintaining the first marker corresponding to the first sector as valid. Moreover, the caching address of the data of the first sector before updating may also be recorded as an idle address so that other data can be subsequently written at the idle address.

For example, assuming that the data stored in the cache before updating is Data A with a caching address being Addr A and the data to be written is Data B, the manner of updating the data Data A of the first sector stored in the cache with the data to be written Data B may be: writing the Data B into the cache where the caching address is Addr B, and updating the caching address of the data of the first sector recorded in the record information of the first strip from Addr A to Add B. Moreover, the caching address Addr A of the data Data A of the first sector before updating may also be recorded as an idle address so that other data can be subsequently written at Addr A.

Figure 5:
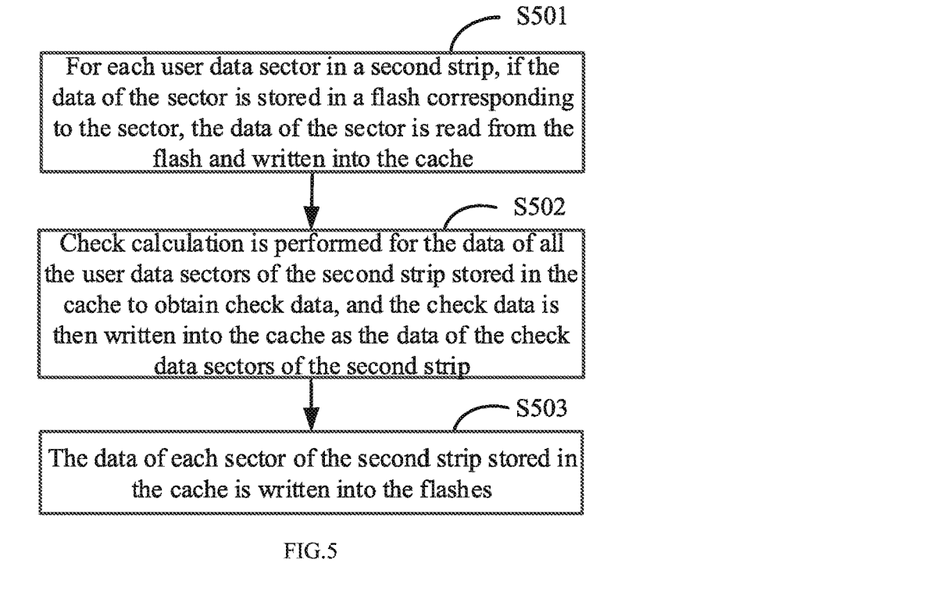
FIG. 5 is flowchart illustrating a strip aging operation according to an example of the present disclosure.

If the data of the first sector in the first strip is modified frequently, the above Blocks S401 to S404 may be performed repeatedly. The data of the first sector stored in the cache may be updated every time the Block S404 is performed, and the data before updating may be regarded as invalid data at this time and wait to be overwritten subsequently by other data. When the first strip ages, the data of the first strip stored in the cache may be written into a flash based on the method as shown in FIG. 5 which will not be redundantly described herein.

At Block S405, the data to be written may be written into the cache as the data of the first sector. Additionally, the caching address of the data of the first sector may be recorded to be the caching address of the data to be written in the record information of the first strip, and the first marker of the first sector may be set to be valid.

At Block S406, the first strip may be established and the data to be written is written into the cache as the data of the first sector. Further, the caching address of the data of the first sector may be recorded to be the caching address of the data to be written in the record information of the first strip and the first marker of the first sector may be set to be valid.

For example, a strip may be established in a process as follows: recording the index and the caching address of the record information of the strip in a Hash bucket corresponding to the strip, calculating a logical channel corresponding to each sector in the strip and recording the logical channels in the record information of the strip, and setting the first marker and the second marker of each sector in the record information of the strip to be invalid.

An identifier p_logic_channel_id of a logical channel corresponding to a check data sector may be calculated according to a formula (3):

$$p\_logic\_channel\_id = strip\_index \ \% \ N \qquad \text{Formula (3)}$$

An identifier d_logic_channel_id of a logical channel corresponding to a user data sector may be calculated according to a formula (4):

$$d\_logic\_channel\_id = \begin{cases} sector\_id, & sector\_id < p\_logic\_channel\_id \\ sector\_id + 1, & sector\_id \geq p\_logic\_channel\_id \end{cases} \qquad \text{Formula (4)}$$

where sector_id represents an identifier of a sector; strip_index represents the index of a strip where a sector is located; and % represents the mod operator.

The total number of the logical channels in an SSD may be identical to that of the physical channels. At initialization, logical channels and physical channels may have a one-to-one correspondence therebetween. For example, at initialization, a logical channel 0 may correspond to a physical channel 0, and a logical channel 1 may correspond to a physical channel 1, and so on. Subsequently, a physical channel in the SSD may fail, for example, the physical channel fails or a flash mounted to the physical channel fails, and the logical channel originally corresponding to the failed physical channel may establish a correspondence with another normal physical channel. The correspondence between the logical channels and the physical channels may be stored in a channel mapping table.

As can be seen from the formula (3), in different strips, the logical channels corresponding to the check data sectors may be uniformly distributed among all the logical channels.

Thus, the check data in different strips may be uniformly distributed in flashes mounted to all the physical channels. In this way, the problem that the service life of a flash is affected because all check data is stored in a flash mounted to a same physical channel can be effectively avoided.

As can be seen from the formula (3) and the formula (4), the logical channels corresponding to different sectors in a same strip may also be uniformly distributed among all the logical channels, thereby improving the parallel access capability of the SSD.

In the method as shown in FIG. 4, the SSD may store the data to be written in the cache first after receiving a data writing command from the host. In this way, for some hotspot data to be modified frequently, it is desired to modify data in the cache without repeatedly erasing and programming a flash, thereby reducing the write application ratio of the SSD.

Strip Aging

Furthermore, after any one strip is established in the cache, the index of the strip may be added to an aging table, where each strip in the aging table has a corresponding priority. The priority of a strip may be related to one or a combination of parameters such as a storage space size of the cache, the number of data reading/writing commands, a strip use frequency, the recent use time of the strip, and the valid data amount of the strip. For example, the priority of a strip having a higher use frequency will be lower, which ensures that data to be frequently modified is stored in the cache as possible so as to reduce the number of times of erasing and programming a flash. For example, a strip having the highest priority may be periodically selected from the aging table for aging.

When it is desired to age a strip, i.e., when the data of the strip in the cache is written into a flash, the SSD may execute the following Blocks as shown in FIG. 5.

At Block S501, for each user data sector in a second strip, if the data of the sector is stored in a flash corresponding to the sector, the data of the sector may be read from the flash and written into the cache.

For example, for each user data sector in the second strip, if the first marker of the sector is invalid and the second marker thereof is valid, it may represent that the data of the sector is stored in the flash. The LBA corresponding to the sector may be determined, and a Physical Block Address (PBA) corresponding to the LBA may be searched for in an address translation table. Then, the data of the sector may be read from the flash based on the obtained PBA and written into the cache. In addition, the first marker of the user data sector may be set to be valid and the caching address of the data of the user data sector may be recorded in the record information of the second strip. The manner of determining the LBA corresponding to the sector may be: calculating the LBA corresponding to the sector according to the formula (1) and the formula (2) on premise that the index of the strip and the identifier of the sector are known.

Thus, after the Block S501 is performed, all the data of different user data sectors in the second strip may be stored in the cache.

At Block S502, check calculation may be performed for the data of all the user data sectors of the second strip stored in the cache to obtain check data, and the check data may be then written into the cache as the data of the check data sector of the second strip. Then, the data of all the sectors (including the user data sectors and the check data sector) in the second strip may be stored in the cache.

It thus can be seen that when data in a strip is written into a flash, check data may be calculated according to user data in the strip.

At Block S503, the data of each sector of the second strip stored in the cache may be written into the flash. Specifically, for each sector in the second strip, the logical channel corresponding to the sector may be determined and the physical channel corresponding to the logical channel may be then searched for, and the data of the sector may be then read from the cache and written into the flash mounted to the physical channel. After the writing is finished, a correspondence between an LBA and a PBA may be recorded in the address translation table, where the LBA may be obtained according to the formula (1) and the formula (2) in the case of the index of the strip and the identifier of the sector being known, and the PBA may be known upon completion of data writing. For example, a PBA may identify an offset position of data in a block and a page in a flash.

After the data of all the sectors of the second strip stored in the cache is written into the flashes, the second strip in the cache may also be deleted. For example, a method of deleting the second strip may specifically include: deleting the index and the caching address of the record information of the second strip recorded in a Hash bucket, and deleting the record information of the second strip. In addition, the caching addresses of the data may also be recorded as idle addresses so that other data can be written subsequently.

In the method as shown in FIG. 5, when a strip ages, the user data and the check data in the strip may be collectively written into flashes.

Data Reading

Figure 6:
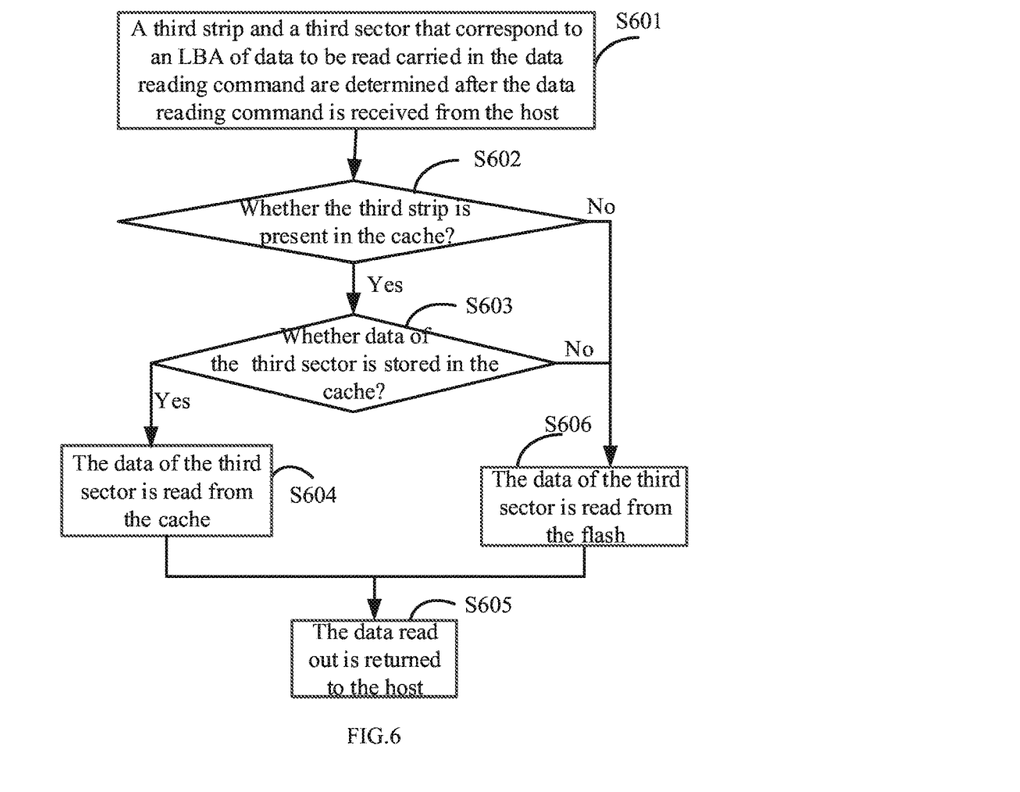
FIG. 6 is a flowchart illustrating a reading operation after a data reading command is received according to an example of the present disclosure.

As shown in FIG. 6, the SSD may perform a reading operation as follows after receiving a data reading command from the host.

At Block S601, a third strip and a third sector that correspond to an LBA of data to be read carried in the data reading command may be determined after the data reading command is received from the host.

At the Block S601, the third strip and the third sector that correspond to the LBA may be determined according to the formula (1) and the formula (2).

At Block S602, whether the third strip is present in the cache may be determined. If yes, Block S603 is performed; otherwise, Block S606 is performed.

For example, a plurality of Hash buckets may be pre-established in a memory. Each Hash bucket is configured to store indexes and caching addresses of record information of a plurality of strips. Thus, whether the third strip is present in the cache may be determined at Block S602 by a method as follows.

Hash calculation may be performed for the index of the third strip and the number of physical channels, N, and the Hash calculation result may be then taken as a bucket ID and a Hash bucket identified by the bucket ID may be then searched for in the memory. For example, CRC32 calculation may be performed on a sum of the index of the third strip and N and then the lower 18 bits of the calculation result may be taken as the bucket ID.

Whether the index of the third strip is present in the obtained Hash bucket may be determined. If yes, it is determined that the third strip is present in the cache and the caching address of the record information of the third strip may be obtained from the Hash bucket. Otherwise, it is determined that the third strip is absent in the cache.

At Block S603, whether data of the third sector is stored in the cache may be determined. If yes, Block S604 is performed; otherwise, it indicates that the data of the third sector is stored in a flash, and Block S606 is then performed.

After the caching address of the record information of the third strip is obtained, the record information of the third strip may be searched for from the cache and whether the data of the third sector is stored in the cache may be determined according to the record information of the third strip. For example, if the first marker of the third sector recorded in the record information of the third strip is valid, it may be determined that the data of the third sector is stored in the cache; otherwise, it may be determined that the data of the third sector is stored in a flash. However, whether the data of the third sector is stored in the flash may also be determined according to the second marker of the third sector recorded in the record information of the third strip. For example, if the second marker of the third sector recorded in the record information of the third strip is valid, it may be determined that the data of the third sector is stored in the flash; otherwise, it may be determined that the data of the third sector is not stored in the flash. In this case, a reading error may occur and it may be desired to report the error to the host.

At Block S604, the data of the third sector may be read from the cache, and then Block S605 is performed.

For example, the caching address of the data of the third sector may be obtained from the record information of the third strip, and thus, the data of the third sector may be read according to the caching address.

At Block S605, the data read out may be returned to the host.

At Block S606, the data of the third sector may be read from the flash, and then the Block S605 is performed.

A manner of reading data from the flash may include: searching in an address translation table for a PBA corresponding to an LBA of the data based on the LBA of the data, and reading the data from the flash based on the obtained PBA.

In an example, if reading the data of the third sector from the flash at Block S606 is failed, data of sectors other than the third sector in the third strip may be read from the flash, and the data of the third sector may be recovered by using the read-out data of the other sectors and then returned to the host.

In the method as shown in FIG. 6, if data to be read is present in the cache when data is read, the data may be read from the cache. If the data to be read is absent in the cache, the data may be read from the flash. In this way, higher data reading and writing speeds may be provided for a user due to a higher speed of reading data from the cache.

Data Recovery and Migration when a Physical Channel Fails

To improve the reliability of the SSD, when a physical channel fails, it is desired to recover the data stored in a flash mounted to the failed physical channel without service interruption, and data in a strip before the failure (hereinafter referred to as an old strip) should be migrated to a new strip. To determine an old strip for which data recovery and migration are already completed, the index of the old strip may be recorded in a strip_recover table after the data recovery and migration is completed for the old strip.

Figure 7:
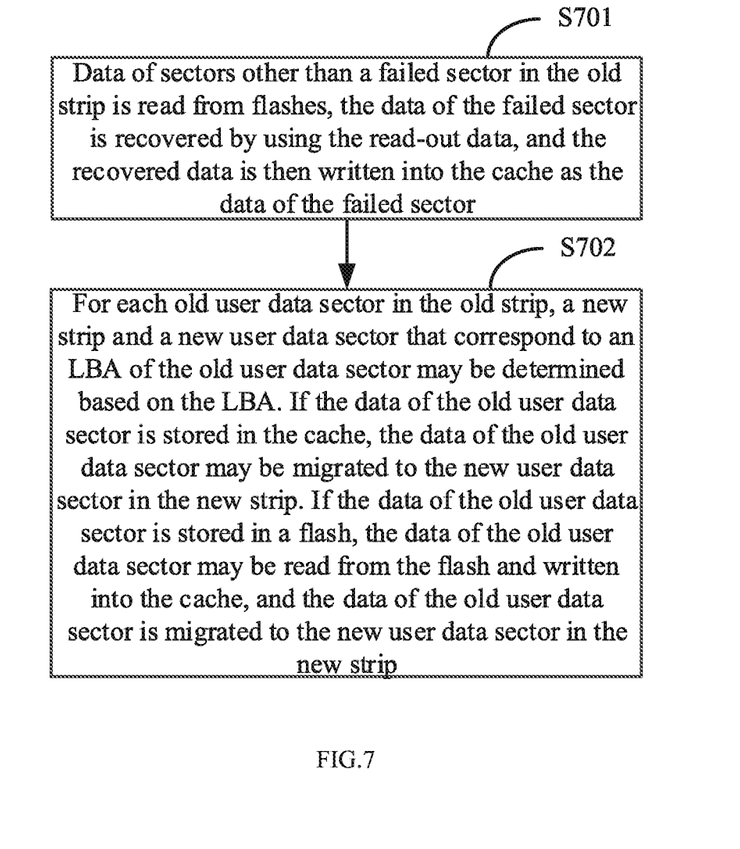
FIG. 7 is a flowchart illustrating a data recovery and migration operation when a physical channel fails according to an example of the present disclosure.

As shown in FIG. 7, when it is detected that a physical channel fails, the following Blocks may be performed for each old strip in the cache.

At Block S701, data of sectors other than a failed sector in the old strip may be read from flashes; the data of the failed sector may be recovered by using the read-out data (including user data and check data), and the recovered data may be then written into the cache as the data of the failed sector.

The number of sectors in the old strip is equal to the number of physical channels before failure. When a physical channel fails, a sector corresponding to a logical channel bound to the physical channel also fails accordingly. In this case, a new strip and a new sector may be re-determined based on the number of normal physical channels in the SSD.

Assuming that the number of the physical channels in the SSD is N before the failure, the strips in this case may be referred to as old strips, and N sectors of each old strip may include: N1 user data sectors and N2 check data sectors.

When a physical channel fails, the number of the physical channels in the SSD is N−1, and the strips in this case may be referred to as new strips and each new strip may include N−1 sectors including: N1−1 user data sectors and N2 check data sectors. Then, when data reading and writing operations are performed, a new strip and a new sector that correspond to an LBA may be determined based on N1−1.

At Block S702, for each old user data sector in the old strip, a new strip and a new user data sector that correspond to an LBA of the old user data sector may be determined based on the LBA. If the data of the old user data sector is stored in the cache, the data of the old user data sector may be migrated to the new user data sector in the new strip. If the data of the old user data sector is stored in a flash, the data of the old user data sector may be read from the flash and written into the cache, and the data of the old user data sector may be migrated to the new user data sector in the new strip.

Subsequently, after the data migration of an old strip is finished, the old strip may be deleted and the index of the old strip may be recorded in the strip_recover table.

For example, a new strip and a new user data sector that correspond to the LBA may be determined according to the formula (1) and the formula (2).

The data of the old user data sector may be migrated to the new user data sector in the new strip in a manner as follows: recording the caching address of the data of the new user data sector in the record information of the new strip as the caching address of the data of the old user data sector.

Apparently, at the Block S702, it is further required to determine whether the new strip is present in the cache before the data of the old user data sector is migrated to the new user data sector in the new strip. If the new strip is not present, it is required to establish the new strip first before the data of the old user data sector is migrated to the new user data sector in the new strip.

Since the number of the physical channels after the failure is reduced in comparison with that before the failure, the number of the sectors in a new strip is less than the number of the sectors in an old strip. Therefore, the user data in a new strip may come from one or two old strips, and the one or two old strips may be referred to as old strip(s) associated with the new strip.

In a practical implementation process, after any new strip is established, the new strip may be added to an aging table. During data recovery and migration, old strips and new strips may be present in the aging table. To facilitate distinguishing old strips from new strips, an SSD mode corresponding to each strip may be marked in the aging table. An old strip may correspond to an SSD mode before failure, for example, an N1+N2 mode; and a new strip may correspond to an SSD mode after failure, for example, a (N1−1)+N2 mode. At the expiry of a predetermined period, a new strip having the highest priority may be selected from the aging table for aging, and it is not desired to age the old strips. It needs to be noted that: when a new strip is to be aged, it is required to determine whether data recovery and migration are already completed for the old strip associated with the new strip first. If the data recovery and migration are already completed, the new strip can be aged and the data of the new strip may be written into flashes. If the data recovery and migration are not completed yet, it is desired to perform data recovery for the associated old strip and then migrate the data of the old strip to the new strip rather than aging the new strip. In this way, it may be avoided that the data of an old strip cannot be recovered due to destruction.

A method of determining an old strip associated with a new strip may include: determining an LBA range corresponding to the new strip based on the formula (1) in the case of the index of the new strip being known; for the minimum value in the LBA range, determining the index of a corresponding first old strip based on the formula (1), and for the maximum value in the LBA range, determining the index of a corresponding second old strip based on the formula (1); determining that there is only one old strip, that is, the first old strip (i.e., the second old strip), associated with the new strip if the index of the first old strip is identical to the index of the second old strip; and determining that there are two old strips, i.e., the first old strip and the second old strip, associated with the new strip if the index of the first old strip is different from the index of the second old strip and a difference value therebetween is 1.

During data recovery and migration, if the SSD receives a data reading command from the host, a new strip corresponding to the LBA of the data to be read carried in the data reading command may be determined; and in the case that the new strip is absent in the cache, the following Blocks are performed:

determining an old strip and an old sector that correspond to the LBA;
if the old strip is present in the cache, reading the data of the old sector from the cache or a flash and returning the data to the host when the physical channel bound to the logical channel corresponding to the old sector is normal, and performing data recovery and migration on the data of the old strip when the physical channel bound to the logical channel corresponding to the old sector fails;
if the old strip is absent in the cache, searching for a PBA corresponding to the LBA in an address translation table when the physical channel bound to the logical channel corresponding to the old sector is normal, reading data from a flash according to the PBA and returning the data to the host, and performing data recovery and migration on the data of the old strip when the physical channel bound to the logical channel corresponding to the old sector fails.

In the above data recovery and migration method, when a physical channel fails, data stored in a flash mounted to the failed physical channel can be recovered and the data in a strip before failure may be migrated to a new strip, thereby ensuring service continuation, improving the fault-tolerant capability of the SSD and increasing the high availability (HA) of services. Moreover, during data recovery and migration, the SSD can normally read and write data, and the new and old strips may be present in parallel.

Corresponding to the examples of the method of accessing an SSD as described above, the present disclosure also provides an example of a device for accessing an SSD.

Figure 8:
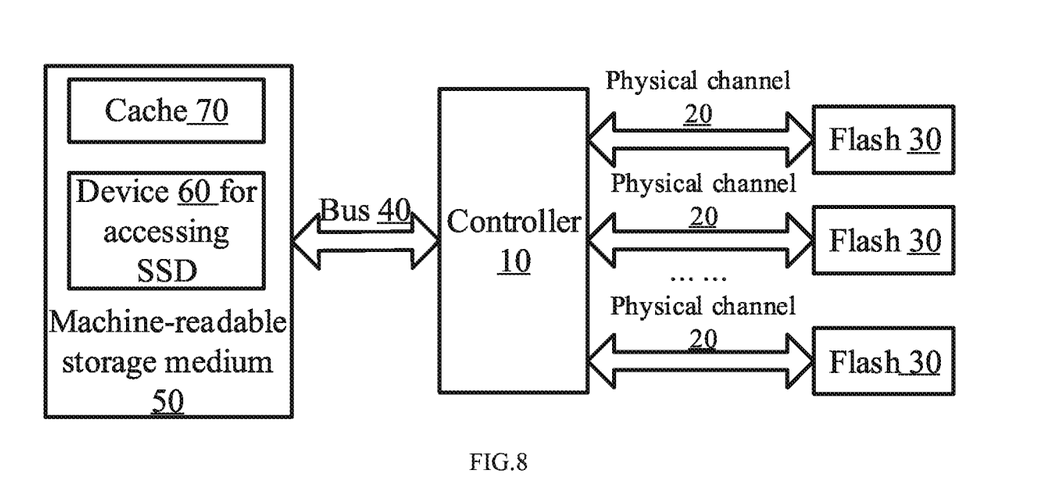
FIG. 8 is a schematic diagram illustrating a hardware structure of an SSD where a device for accessing an SSD is located according to an example of the present disclosure.

The example of the device for accessing an SSD in this disclosure may be applied to an SSD. From the level of hardware, FIG. 8 is a schematic diagram illustrating a hardware structure of an SSD where a device for accessing an SSD is located according to an example of the present disclosure. The SSD may include: a controller 10, more than three physical channels 20, and Flashes 30 respectively mounted to each of the physical channels 20, a bus 40, and a machine-readable storage medium 50, where a storage space may be partitioned from the machine-readable storage medium 50 as a cache 70, which is not limited hereto. The cache 70 may also be implemented in other manners. By reading machine-executable instructions on the machine-readable storage medium 50, the controller 10 may execute the method of accessing an SSD as described above. The controller 10 may be, for example, a processor, such as a Central Processing Unit (CPU). In a practical implementation process, other hardware may also be included according to actual functions of the SSD, which will not be redundantly described herein.

The machine-readable storage medium 50 described herein may be any electronic, magnetic, optical or other physical storage device, and may contain or store information, such as executable instructions, data and the like. For example, the machine-readable storage medium may be a volatile storage medium or a non-volatile storage medium such as a Random Access Memory (RAM), a flash memory, a storage drive (e.g., hard disk drive), any type of storage disk, or a combination thereof.

An example of the device 60 for accessing an SSD of the present disclosure may be implemented by software, or by hardware or a combination of software and hardware. Taking implementation by software for example, the device, as a logical device, may be formed by reading and running machine-executable instructions on the machine-readable storage medium 50 by a controller 10 of an SSD where the device is located.

Figure 9:
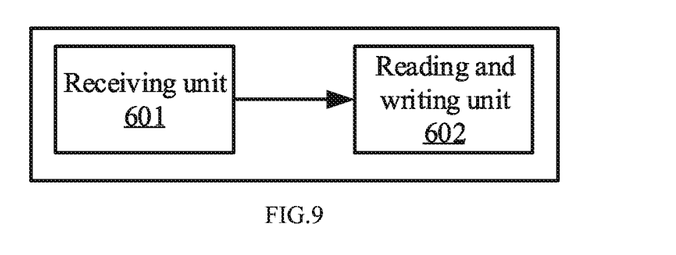
FIG. 9 is a schematic diagram illustrating a structure of a device for accessing an SSD according to an example of the present disclosure.

Referring to FIG. 9, the device 60 for accessing an SSD in an example of the present disclosure may include: a receiving unit 601 and a reading and writing unit 602.

The receiving unit 601 is configured to receive a data writing command for an SSD and determine a first strip and a first sector that correspond to an LBA of data to be written carried in the data writing command, where the SSD includes N physical channels and a cache; each physical channel is mounted with a flash; the cache includes a plurality of strips; and each strip includes N sectors with N being an integer greater than or equal to 3.

The reading and writing unit 602 is configured to write the data to be written in the cache as data of the first sector if the first strip is present in the cache, and establish the first strip and write the data to be written in the cache as data of the first sector if the first strip is absent in the cache.

The receiving unit 601 is specifically configured to determine an index strip_index of the strip and an identifier sector_id of the sector that correspond to the LBA according to the following formulas:

$$\text{strip\_index} = \lfloor LBA/N1 \rfloor$$

$$\text{sector\_id} = LBA \% N1$$

where N1 represents the number of sectors for storing user data in a strip, N1 being an integer greater than 1 and less than N; $\lfloor \ \rfloor$ represents a rounding-down operator; and % represents a mod operator.

Figure 10:
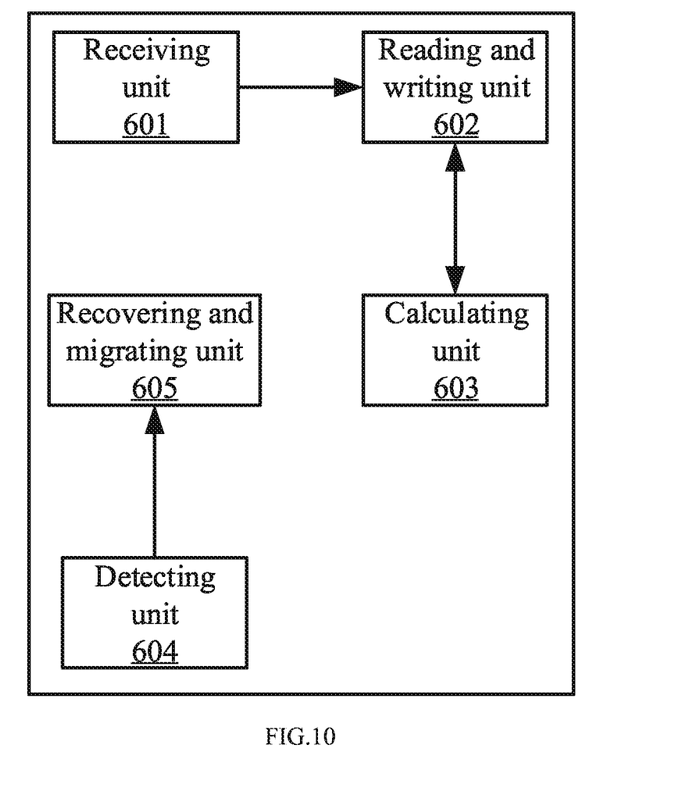
FIG. 10 is a schematic diagram illustrating another structure of a device for accessing an SSD according to an example of the present disclosure.

As shown in FIG. 10, the above device 60 for accessing an SSD may further include: a calculating unit 603.

The reading and writing unit 602 is configured to: for each user data sector in a second strip, read data of the sector from a flash and write the data in the cache when the data of the sector is stored in the flash.

The calculating unit 603 is configured to perform check calculation on data of all user data sectors of the second strip stored in the cache to obtain check data of a check data sector of the second strip.

The reading and writing unit 602 is configured to write the check data of the check data sector of the second strip calculated by the calculating unit 603 into the cache, and also configured to write the data of all the sectors of the second strip stored in the cache into flashes.

The reading and writing unit 602 is also configured to write the data of a sector of the second strip stored in the cache into a flash in the following manner:

determining a logical channel corresponding to the sector, searching for a physical channel corresponding to the logical channel, and writing the data of the sector stored in the cache into the flash mounted to the physical channel.

Determining the logical channel corresponding to the sector includes:

determining an identifier d_logic_channel_id of the logical channel corresponding to a user data sector as follows when the sector is the user data sector for storing user data:

$$d\_logic\_channel\_id = \begin{cases} sector\_id, & sector\_id < p\_logic\_channel\_id \\ sector\_id + 1, & sector\_id \geq p\_logic\_channel\_id \end{cases}$$

determining an identifier p_logic_channel_id of the logical channel corresponding to a check data sector as follows when the sector is the check data sector for storing check data:

$$p\_logic\_channel\_id = strip\_index \% N$$

where sector_id represents an identifier of the sector; strip_index represents an index of a strip where the sector is located; and % represents the mod operator.

The receiving unit 601 is further configured to receive a data reading command for the SSD, and determine a third strip and a third sector that correspond to an LBA of data to be read carried in the data reading command.

The reading and writing unit 602 is further configured to read data of the third sector from the cache as the data to be read if the third strip is present in the cache and the data of the third sector is stored in the cache; read data of the third sector from a flash corresponding to the third sector as the data to be read if the third strip is present in the cache and the data of the third sector in the third strip is stored in the flash, or the third strip is not present in the cache.

As shown in FIG. 10, the above device 60 for accessing an SSD may further include the following units.

A detecting unit 604 is configured to detect a state of a physical channel.

A recovering and migrating unit 605 is configured to perform the following blocks for an old strip in the cache when the detecting unit 604 detects that one of the N physical channels fails:

reading data of sectors other than a failed sector in the old strip from the flash, where the failed sector is a sector corresponding to a logical channel bound to the failed physical channel;

recovering data of the failed sector using the read-out data;

writing the recovered data into the cache as the data of the failed sector;

determining, for an LBA of each user data sector in the strip, a new strip and a new user data sector that correspond to the LBA, where the number of sectors in the new strip is equal to the number of normal physical channels in the SSD;

migrating data of the user data sector to the new user data sector in the new strip if the data of the user data sector is stored in the cache; and migrating the data of the user data sector to the new user data sector in the new strip after reading the data of the user data sector from the flash and writing the data into the cache if data of the user data sector is stored in the flash.

Details of the implementation process of the functions and effects of different units in the above-described device may be seen from the implementation process of corresponding Blocks in the above-described method, which will not be redundantly described herein.

Since the device examples substantially correspond to the method examples, a reference may be made to part of the descriptions of the method examples for the related part. The device examples described above are merely illustrative, where the units described as separate members may be or not be physically separated, and the members displayed as units may be or not be physical units, i.e., may be located in one place, or may be distributed to a plurality of network units. Part or all of the modules may be selected according to actual requirements to implement the objectives of the solutions in the examples. Those of ordinary skill in the art may understand and carry out them without creative work.

It shall be noted that the relational terms such as "first" and "second" used herein are merely intended to distinguish one entity or operation from another entity or operation rather than to require or imply any such actual relation or order existing between these entities or operations. Also, the term "including", "containing" or any variation thereof is intended to encompass non-exclusive inclusion, so that a process, method, article or device including a series of elements includes not only those elements but also other elements not listed explicitly or those elements inherent to such a process, method, article or device. Without more limitations, an element defined by the statement "including a . . . " shall not be precluded to include additional same elements present in a process, method, article or device including the elements.

The above are detailed descriptions of a method and a device provided according to the examples of the present disclosure. Specific examples are used herein to set forth the principles and the implementing methods of the present disclosure, and the descriptions of the above examples are only meant to help understanding of the method and the core idea of the present disclosure. Meanwhile, those of ordinary skill in the art may make alterations to the specific examples and the scope of application in accordance with the idea of the present disclosure. In conclusion, the contents of the present specification shall not be interpreted as limiting to the present disclosure.

The invention claimed is:

1. A method of accessing a Solid State Disk (SSD), comprising:

receiving a data writing command for an SSD, wherein the SSD comprises N physical channels and a cache, each of the physical channels is mounted with a flash, the cache comprises a plurality of strips, and each of the plurality of strips comprises N sectors, N being an integer greater than or equal to 3;
determining a first strip and a first sector that correspond to a Logical Block Address (LBA) of data to be written carried in the data writing command;
writing the data to be written into the cache as data of the first sector when the first strip is present in the cache; and
establishing the first strip and writing the data to be written into the cache as data of the first sector when the first strip is absent in the cache,
wherein the method further comprises:
  writing data of a sector stored in the cache into a flash by
    determining a logical channel corresponding to the sector;
    searching for a physical channel corresponding to the logical channel; and
    writing the data of the sector stored in the cache into the flash mounted to the physical channel,
  wherein determining the logical channel corresponding to the sector comprises:
    when the sector is a user data sector for storing user data,
      determining an identifier d_logic_channel_id of the logical channel corresponding to the user data sector as follows:

$$d\_logic\_channel\_id = \begin{cases} sector\_id, & sector\_id < p\_logic\_channel\_id \\ sector\_id + 1, & sector\_id \geq p\_logic\_channel\_id \end{cases};$$

when the sector is a check data sector for storing check data,
      determining an identifier p_logic_channel_id of the logical channel corresponding to the check data sector as follows:

$$p\_logic\_channel\_id = strip\_index \% N$$

wherein, sector_id represents an identifier of the sector; strip_index represents an index of a strip where the sector is located; and % represents a mod operator.

2. The method according to claim 1, wherein determining the first strip and the first sector that correspond to the LBA of the data to be written carried in the data writing command comprises:

determining an index strip_index=$\lfloor LBA/N1 \rfloor$ of the first strip; and determining an identifier sector_id=$LBA \% N1$ of the first sector;

wherein N1 represents a number of sectors for storing user data in a strip, N1 being an integer greater than 1 and less than N;
$\lfloor \; \rfloor$ represents a rounding-down operator; and
% represents a mod operator.

3. The method according to claim 1, further comprising:
for each user data sector in a second strip,
  reading data of the sector from a corresponding flash and writing the data into the cache when the data of the sector is stored in the flash;
  obtaining check data of a check data sector of the second strip by performing check calculation on data of all user data sectors of the second strip stored in the cache, and writing the check data into the cache; and
  writing data of all sectors of the second strip stored in the cache into flashes.

4. The method according to claim 1, further comprising:
receiving a data reading command for the SSD;
determining a third strip and a third sector that correspond to an LBA of data to be read carried in the data reading command;
reading data of the third sector from the cache as the data to be read when the third strip is present in the cache and the data of the third sector is stored in the cache;
reading the data of the third sector from a flash corresponding to the third sector as the data to be read when the third strip is present in the cache and the data of the third sector in the third strip is stored in the flash; and
reading the data of the third sector from a flash corresponding to the third sector as the data to be read when the third strip is absent in the cache.

5. The method according to claim 1, further comprising:
when detecting that one of the N physical channels fails, performing, for an old strip in the cache, the following steps:
  reading data of sectors other than a failed sector in the strip from the flash, wherein the failed sector is a sector corresponding to a logical channel bound to the failed physical channel;
  recovering data of the failed sector using the read-out data;
  writing the recovered data into the cache as data of the failed sector;
  determining, based on an LBA of each user data sector in the strip, a new strip and a new user data sector that correspond to the LBA, wherein the number of sectors in the new strip is equal to the number of normal physical channels in the SSD;
  when data of a user data sector is stored in the cache, migrating the data of the user data sector to the new user data sector in the new strip; and
  when data of the user data sector is stored in the flash, migrating the data of the user data sector to the new user data sector in the new strip after reading the data of the user data sector from the flash and writing the data into the cache.

6. A Solid State Disk (SSD), comprising:
a cache comprising a plurality of strips, wherein each of the plurality of strips comprises N sectors, N being an integer greater than or equal to 3;
N physical channels;
Flashes respectively mounted to each of the physical channels;
a controller; and
a machine-readable storage medium that stores machine-executable instructions, wherein the controller is caused by reading and executing the machine-executable instructions to:
  receive a data writing command for the SSD;
  determine a first strip and a first sector that correspond to a Logical Block Address (LBA) of data to be written carried in the data writing command;
  write the data to be written into the cache as data of the first sector when the first strip is present in the cache; and
  establish the first strip and write the data to be written into the cache as data of the first sector when the first strip is absent in the cache, wherein the controller is further caused by the machine-executable instructions to:
  write data of a sector stored in the cache into a flash by
    determining a logical channel corresponding to the sector;
    searching for a physical channel corresponding to the logical channel; and
    writing the data of the sector stored in the cache into the flash mounted to the physical channel,
wherein when determining the logical channel corresponding to the sector, the controller is further caused by the machine-executable instructions to:
  when the sector is a user data sector for storing user data,
    determine an identifier d_logic_channel_id of the logical channel corresponding to the user data sector as follows:

$$d\_logic\_channel\_id = \begin{cases} sector\_id, & sector\_id < p\_logic\_channel\_id \\ sector\_id + 1, & sector\_id \geq p\_logic\_channel\_id \end{cases};$$

when the sector is a check data sector for storing check data,
    determine an identifier p_logic_channel_id of the logical channel corresponding to the check data sector as follows:

$$p\_logic\_channel\_id = strip\_index \% N$$

wherein, sector_id represents an identifier of the sector; strip_index represents an index of a strip where the sector is located; and % represents a mod operator.

7. The SSD according to claim 6, wherein when determining the first strip and the first sector that correspond to the LBA of the data to be written carried in the data writing command, the controller is further caused by the machine-executable instructions to:

determine an index strip_index=⌊LBA/N1⌋ of the first strip; and determine an identifier sector_id=LBA % N1 of the first sector;

wherein N1 represents a number of sectors for storing user data in a strip, N1 being an integer greater than 1 and less than N;
⌊ ⌋ represents a rounding-down operator; and
% represents a mod operator.

8. The SSD according to claim 6, wherein the controller is further caused by the machine-executable instructions to:
for each user data sector in a second strip,
  read data of the sector from a corresponding flash and write the data into the cache when the data of the sector is stored in the flash;
  obtain check data of a check data sector of the second strip by performing check calculation on data of all user data sectors of the second strip stored in the cache, and write the check data into the cache; and
  write data of all sectors of the second strip stored in the cache into flashes.

9. The SSD according to claim 6, wherein the controller is further caused by the machine-executable instructions to:
receive a data reading command for the SSD;
determine a third strip and a third sector that correspond to an LBA of data to be read carried in the data reading command;
read data of the third sector from the cache as the data to be read when the third strip is present in the cache and the data of the third sector is stored in the cache;
read the data of the third sector from a flash corresponding to the third sector as the data to be read when the third strip is present in the cache and the data of the third sector in the third strip is stored in the flash; and
read the data of the third sector from a flash corresponding to the third sector as the data to be read when the third strip is absent in the cache.

10. The SSD according to claim 6, wherein the controller is further caused by the machine-executable instructions to:
when detecting that one of the N physical channels fails, perform, for an old strip in the cache, the following steps:
  reading data of sectors other than a failed sector in the strip from the flash, wherein the failed sector is a sector corresponding to a logical channel bound to the failed physical channel;
  recovering data of the failed sector using the read-out data;
  writing the recovered data into the cache as data of the failed sector;
  determining, based on an LBA of each user data sector in the strip, a new strip and a new user data sector that correspond to the LBA, wherein the number of sectors in the new strip is equal to the number of normal physical channels in the SSD;
  when data of a user data sector is stored in the cache, migrating the data of the user data sector to the new user data sector in the new strip; and
  when data of the user data sector is stored in the flash, migrating the data of the user data sector to the new user data sector in the new strip after reading the data of the user data sector from the flash and writing the data into the cache.

* * * * *